US012775259B2

(12) United States Patent
Yeo

(10) Patent No.: US 12,775,259 B2
(45) Date of Patent: Oct. 27, 2026

(54) COOKING APPARATUS AND METHOD FOR CONTROLLING THEREOF

(71) Applicant: SAMSUNG ELECTRONICS CO., LTD., Suwon-si (KR)

(72) Inventor: Haedong Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 376 days.

(21) Appl. No.: 18/219,393

(22) Filed: Jul. 7, 2023

(65) Prior Publication Data

US 2023/0418252 A1 Dec. 28, 2023

Related U.S. Application Data

(63) Continuation of application No. PCT/KR2023/008372, filed on Jun. 16, 2023.

(30) Foreign Application Priority Data

Jun. 23, 2022 (KR) ........................ 10-2022-0077150
Aug. 18, 2022 (KR) ........................ 10-2022-0103516

(51) Int. Cl.
*A47J 36/32* (2006.01)
*F24C 3/12* (2006.01)
(Continued)

(52) U.S. Cl.
CPC ............ *G05B 19/042* (2013.01); *A47J 36/32* (2013.01); *F24C 3/126* (2013.01); *F24C 7/083* (2013.01); *G06V 20/52* (2022.01)

(58) Field of Classification Search
CPC ....... G05B 19/042; G06V 20/52; A47J 36/32; F24C 3/126; F24C 7/083
See application file for complete search history.

(56) References Cited

U.S. PATENT DOCUMENTS 8,530,842 B2 9/2013 Has et al.
10,488,975 B2 11/2019 Yeung et al.
(Continued)

FOREIGN PATENT DOCUMENTS

CN 110413186 A 11/2019
CN 110597450 A 12/2019
(Continued)

OTHER PUBLICATIONS

Communication issued May 22, 2025 by the European Patent Office in European Patent Application No. 23827452.6.
(Continued)

*Primary Examiner* — Steven N Leff
(74) *Attorney, Agent, or Firm* — Sughrue Mion, PLLC

(57) ABSTRACT

A cooking apparatus and a method for controlling thereof are disclosed. The cooking apparatus includes a camera configured to capture an image of the cooking apparatus and at least part of an area surrounding the cooking apparatus; a user interface configured to detect input for control of the cooking apparatus; at least one memory storing at least one instruction; and at least one processor configured to execute the at least one instruction to: acquire, through the camera, the image of the cooking apparatus and the at least part of the area surrounding the cooking apparatus, detect through the user interface an input for control of the cooking apparatus, based on the image, identify whether the input corresponds to a cooking act using the cooking apparatus, and based on identifying that the input corresponds to the cooking act using the cooking apparatus, control the cooking apparatus to perform a cooking operation corresponding to the input.

14 Claims, 9 Drawing Sheets

(51) Int. Cl.

| | |
|---|---|
| ***F24C 7/08*** | (2006.01) |
| ***G05B 19/042*** | (2006.01) |
| ***G06V 20/52*** | (2022.01) |

(56) References Cited

U.S. PATENT DOCUMENTS

| | | | | |
|---|---|---|---|---|
| 10,949,022 | B2 | 3/2021 | Lee | |
| 11,687,776 | B2 | 6/2023 | Jeong | |
| 11,721,053 | B2 | 8/2023 | Yeon et al. | |
| 2005/0236391 | A1 | 10/2005 | Gama et al. | |
| 2009/0258331 | A1* | 10/2009 | Do | G09B 21/003 434/127 |
| 2011/0254939 | A1 | 10/2011 | Kadantseva et al. | |
| 2014/0208957 | A1 | 7/2014 | Imai et al. | |
| 2015/0285513 | A1* | 10/2015 | Matarazzi | F24C 7/085 99/342 |
| 2016/0051078 | A1 | 2/2016 | Jenkins et al. | |
| 2017/0074522 | A1* | 3/2017 | Cheng | F24C 7/085 |
| 2018/0130466 | A1 | 5/2018 | Beifuss et al. | |
| 2018/0372332 | A1 | 12/2018 | Cha et al. | |
| 2020/0019861 | A1 | 1/2020 | Jeong | |
| 2021/0231311 | A1 | 7/2021 | Ye et al. | |
| 2022/0051458 | A1 | 2/2022 | Yeon et al. | |
| 2022/0156496 | A1* | 5/2022 | Drake | G06V 20/52 |
| 2022/0287498 | A1* | 9/2022 | Hua | G06V 20/68 |

FOREIGN PATENT DOCUMENTS

| | | | | |
|---|---|---|---|---|
| CN | 111431775 | A | 7/2020 | |
| CN | 111409459 | B | 12/2021 | |
| DE | 20 2012 005 255 | U1 | 8/2012 | |
| EP | 1 951 002 | A1 | 7/2008 | |
| EP | 2 326 882 | B1 | 2/2019 | |
| KR | 10-1920068 | B1 | 2/2019 | |
| KR | 10-2019-0105531 | A | 9/2019 | |
| KR | 10-2020-0030955 | A | 3/2020 | |
| KR | 10-2021-0092023 | A | 7/2021 | |
| KR | 10-2021-0095419 | A | 8/2021 | |
| KR | 10-2372170 | B1 | 3/2022 | |
| WO | 2013/121785 | A1 | 8/2013 | |
| WO | 2018/163022 | A1 | 9/2018 | |
| WO | 2019/209371 | A1 | 10/2019 | |
| WO | WO-2020207293 | A1 * | 10/2020 | G06F 18/214 |

OTHER PUBLICATIONS

International Search Report dated Sep. 19, 2023 issued by the International Searching Authority in International Application No. PCT/KR2023/008372 (PCT/ISA/210).

Written Opinion dated Sep. 19, 2023 issued by the International Searching Authority in International Application No. PCT/KR2023/008372 (PCT/ISA/237).

Communication dated Jul. 2, 2026, issued by the European Patent Office in European Application No. 23827452.6.

* cited by examiner

COOKING APPARATUS AND METHOD FOR CONTROLLING THEREOF

CROSS-REFERENCE TO RELATED APPLICATION(S)

This application is a by-pass continuation of International Application No. PCT/KR2023/008372, filed on Jun. 16, 2023, at the Korean Intellectual Property Receiving Office, which is based on and claims priority to Korean Patent Application No. 10-2022-0077150, filed on Jun. 23, 2022, in the Korean Patent Office, and to Korean Patent Application No. 10-2022-0103516, filed on Aug. 18, 2022, in the Korean Patent Office, the disclosures of all of which are incorporated by reference herein in their entireties.

BACKGROUND

1. Field

The disclosure relates to a cooking apparatus and a method for controlling thereof, and more particularly, to a cooking apparatus that identifies an unintended input for control of the cooking apparatus and prevents a malfunction of the cooking apparatus, and a method for controlling thereof.

2. Description of Related Art

A cooking apparatus such as a gas stove, an induction oven, a microwave oven, etc. receives a control instruction of a user through a user interface such as a button, a lever, a touch pad, etc., and performs a cooking operation (e.g.: heating, cooling).

In case a user cooks food by using a cooking apparatus as above, a foreign substance (e.g.: water, an ingredient) may be splattered on a user interface in the process of moving the ingredients of food to a cooking tool included in the cooking apparatus (e.g.: a pot, a frying pan, a cooking container), performing a cooking act (e.g.: heating, mixing, stir-frying, flipping over) by using the cooking apparatus, or heating the ingredients of food by the cooking apparatus. Due to this, it is possible that the cooking apparatus recognizes the foreign substance as a control instruction of the user and an incorrect cooking operation occurs.

Also, a user may be confused about a cooking method and a cooking step, and input a wrong control instruction of the cooking apparatus through the user interface. Due to this, it is possible that the cooking apparatus may perform an incorrect cooking operation according to the wrong control instruction of the user.

Accordingly, there is a need for a method for controlling a cooking apparatus so that the cooking apparatus performs the correct cooking operation by identifying an unintended input due to a foreign substance or an incorrect input that does not fit a cooking method is requested.

SUMMARY

According to an aspect of the disclosure, a cooking apparatus includes: a camera configured to capture an image of the cooking apparatus and at least part of an area surrounding the cooking apparatus; a user interface configured to detect input for control of the cooking apparatus; at least one memory storing at least one instruction; and at least one processor configured to execute the at least one instruction to: acquire, through the camera, the image of the cooking apparatus and the at least part of the area surrounding the cooking apparatus, detect through the user interface an input for control of the cooking apparatus, based on the image, identify whether the input corresponds to a cooking act using the cooking apparatus, and based on identifying that the input corresponds to the cooking act using the cooking apparatus, control the cooking apparatus to perform a cooking operation corresponding to the input.

The at least one processor may be further configured to execute the at least one instruction to, based on identifying that the input does not correspond to a cooking act using the cooking apparatus, prevent performance of a cooking operation corresponding to the input.

The cooking apparatus may further include a communication interface configured to communicate with an external electronic apparatus, and the at least one processor may be further configured to execute the at least one instruction to: based on identifying that the input corresponds to a cooking act using the cooking apparatus, identify whether the cooking act using the cooking apparatus is matched to a current cooking step based on recipe information, and based on identifying that the input corresponds to the cooking act using the cooking apparatus and identifying that the cooking act is matched to the current cooking step, control the cooking apparatus to perform the cooking operation corresponding to the input.

The at least one processor may be further configured to execute the at least one instruction to, based on identifying that the cooking act is not matched to the current cooking step, provide a notification seeking confirmation that the input corresponds to the current cooking step.

The at least one processor may be further configured to execute the at least one instruction to, based on identifying that the cooking act is not matched to the current cooking step, provide a notification including information on a cooking act matched to the current cooking step based on the recipe information.

The at least one processor may be further configured to execute the at least one instruction to, based on identifying that the input does not correspond to a cooking act using the cooking apparatus, initiate a cooking operation corresponding to the input and subsequently cancel the cooking operation corresponding to the input.

The at least one processor may be further configured to execute the at least one instruction to: acquire, through the camera, a plurality of image frames of the cooking apparatus and the at least part of the area surrounding the cooking apparatus, identify, among the plurality of image frames, a plurality of section image frames divided into predetermined sections, and based on the plurality of section image frames, identify whether the input corresponds to a cooking act using the cooking apparatus.

The plurality of section image frames include a first plurality of section image frames and a second plurality of section image frames corresponding to one or more predetermined sections, and the first plurality of section image frames and the second plurality of section image frames include at least one same image frame from among the plurality of image frames.

According to an aspect of the disclosure, a method of controlling a cooking apparatus, includes: acquiring an image of the cooking apparatus and at least part of an area surrounding the cooking apparatus; detecting an input for control of the cooking apparatus; based on the image, identifying whether the input corresponds to a cooking act using the cooking apparatus; and based on identifying that the input corresponds to a cooking act using the cooking apparatus, performing a cooking operation corresponding to the input.

The method may further include, based on identifying that the input does not correspond to a cooking act using the cooking apparatus, preventing performance of a cooking operation corresponding to the input.

The method may further include: acquiring recipe information for a cooking method including a cooking act using the cooking apparatus; and based on identifying that the input corresponds to a cooking act using the cooking apparatus, identifying whether the cooking act using the cooking apparatus is matched to a current cooking step based on the recipe information, and the performing a cooking operation may include, based on identifying that the input corresponds to the cooking act using the cooking apparatus and identifying that the cooking act is matched to the current cooking step, performing the cooking operation corresponding to the input.

The method may further include, based on identifying that the cooking act is not matched to the current cooking step, providing a notification seeking confirmation that the input corresponds to the current cooking step.

The method may further include, based on identifying that the cooking act is not matched to the current cooking step, providing a notification including information on a cooking act matched to the current cooking step based on the recipe information.

The method may further include, based on identifying that the input does not correspond to a cooking act using the cooking apparatus, initiating a cooking operation corresponding to the input and subsequently canceling the cooking operation corresponding to the input.

According to an aspect of the disclosure, a non-transitory computer-readable recording medium having instructions stored therein, which when executed by a processor cause the processor to execute a method of controlling a cooking apparatus, the method including: acquiring an image of the cooking apparatus and at least part of an area surrounding the cooking apparatus; detecting an input for control of the cooking apparatus; based on the image, identifying whether the input corresponds to a cooking act using the cooking apparatus; and based on identifying that the input corresponds to a cooking act using the cooking apparatus, performing a cooking operation corresponding to the input.

BRIEF DESCRIPTION OF THE DRAWINGS

The above and other aspects, features, and advantages of certain embodiments of the present disclosure will be more apparent from the following description with reference to the accompanying drawings, in which.

DETAILED DESCRIPTION

Figure 1:
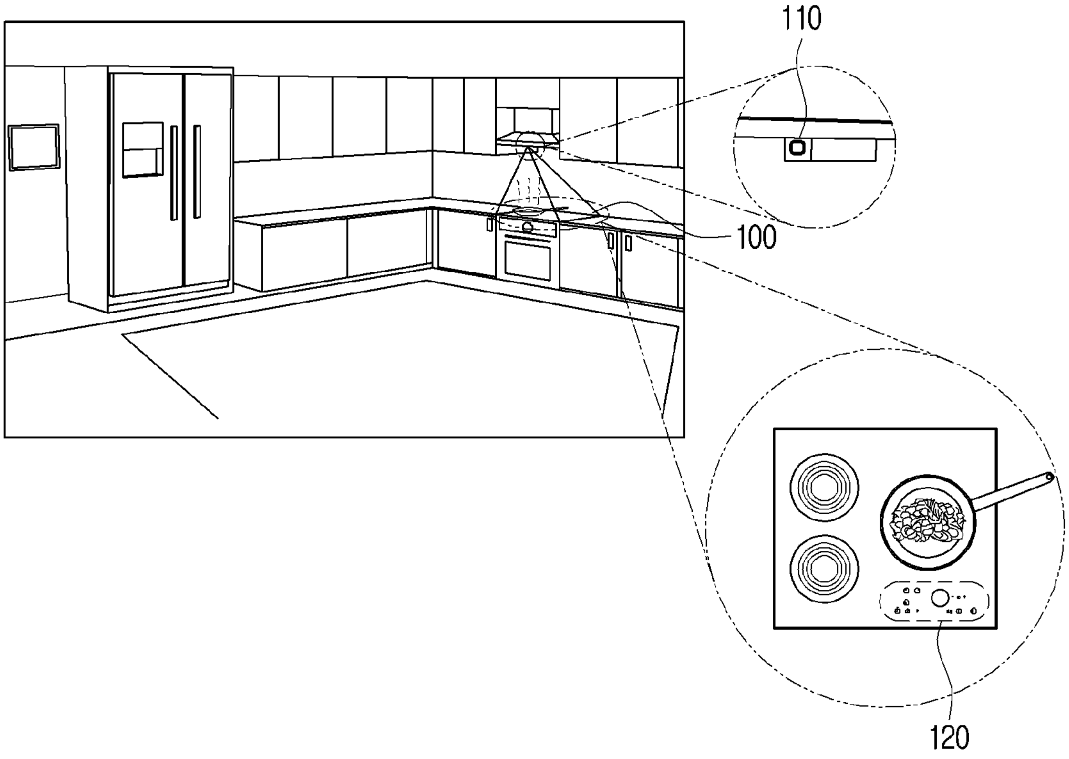
FIG. 1 is a diagram for illustrating a cooking apparatus according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

Further, the embodiments described below may be modified in various different forms, and the scope of the technical idea of the disclosure is not limited to the embodiments below Rather, these embodiments are provided to make the disclosure more sufficient and complete, and to fully convey the technical idea of the disclosure to those skilled in the art.

Also, the terms used in the disclosure are used only to explain specific embodiments, and are not intended to limit the scope of the disclosure. Further, singular expressions include plural expressions, unless defined obviously differently in the context.

In addition, in the disclosure, expressions such as “have,” “may have,” “include,” and “may include” denote the existence of such characteristics (e.g.: elements such as numbers, functions, operations, and components), and do not exclude the existence of additional characteristics.

Further, in the disclosure, the expressions “A or B,” “at least one of A and/or B,” or “one or more of A and/or B” and the like may include all possible combinations of the listed items. For example, “A or B,” “at least one of A and B,” or “at least one of A or B” may refer to all of the following cases: (1) only A, (2) only B, or (3) both A and B.

Also, the expressions “first,” “second,” and the like used in the disclosure may describe various elements regardless of any order and/or degree of importance. Further, such expressions are used only to distinguish one element from another element, and are not intended to limit the elements.

In addition, the description in the disclosure that one element (e.g.: a first element) is “(operatively or communicatively) coupled with/to” or “connected to” another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Further, in the embodiments of the disclosure, 'a module' or 'a part' may perform at least one function or operation, and may be implemented as hardware or software, or as a combination of hardware and software. Also, a plurality of 'modules' or 'parts' may be integrated into at least one module and implemented as at least one processor, excluding 'a module' or 'a part' that needs to be implemented as specific hardware.

Various elements and areas in the drawings are illustrated schematically. Accordingly, the technical idea of the disclosure is not limited by the relative sizes or intervals illustrated in the accompanying drawings.

Hereinafter, the embodiments according to the disclosure will be described in detail with reference to the accompanying drawings, such that those having ordinary skill in the art to which the disclosure belongs can easily carry out the disclosure.

FIG. 1 is a diagram for illustrating a cooking apparatus according to an embodiment of the disclosure.

Referring to FIG. 1, the cooking apparatus 100 may be a gas stove or an induction oven performing a heating operation to cook food. However, the disclosure is not limited thereto, and the cooking apparatus 100 may be an electronic apparatus that can perform various cooking operations (e.g.: heating, cooling) other than a heating operation.

The cooking apparatus 100 may include a camera 110 as one component as illustrated in FIG. 1. The camera 110 may be located on the upper end of a cooking part wherein the cooking apparatus 100 performs cooking operations. However, the disclosure is not limited thereto, and the camera 110 may be arranged in various locations wherein it can photograph the cooking apparatus 100 and the surrounding part of the cooking apparatus 100.

The cooking apparatus 100 may include a user interface 120 as one component in one area of the cooking part. The user interface 120 may be arranged in the surrounding part of the cooking part or one area of the cooking part wherein the cooking apparatus 100 performs cooking operations, as illustrated in FIG. 1, and detect an input related to control of the cooking apparatus 100. However, the disclosure is not limited thereto, and the user interface 120 may be arranged in various locations in some areas of the cooking apparatus 100.

The content regarding the cooking apparatus 100 and the operations of each component of the cooking apparatus 100 will be described in more detail with reference to FIG. 2.

Figure 2:
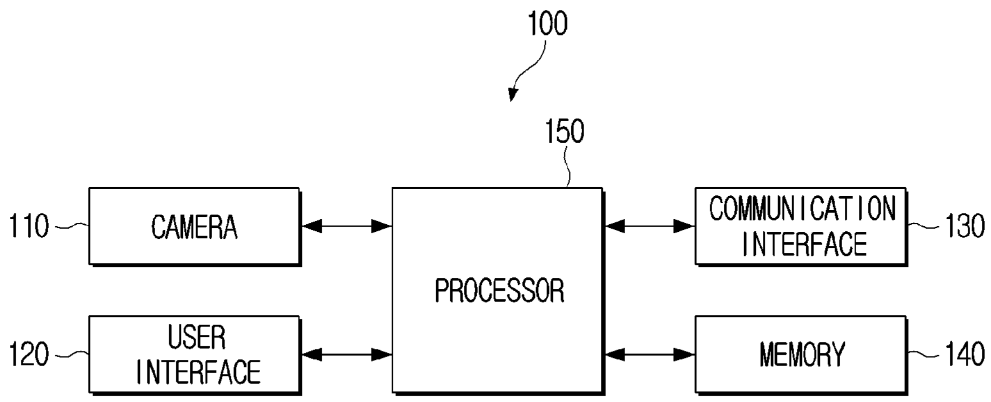
FIG. 2 is a block diagram illustrating a configuration of a cooking apparatus according to an embodiment of the disclosure.

FIG. 2 is a block diagram illustrating a configuration of the cooking apparatus 100 according to an embodiment of the disclosure.

The cooking apparatus 100 may be a gas stove, an induction, an oven, or a microwave oven. However, the disclosure is not limited thereto, and the cooking apparatus 100 may be various electronic apparatuses that are used in cooking food, and can perform cooking operations of food such as heating, cooling, etc. through the cooking part.

Referring to FIG. 2, the cooking apparatus 100 may include a camera 110 photographing the cooking apparatus 100 and the surrounding part of the cooking apparatus 100, a user interface 120 detecting input for control of the cooking apparatus 100, a memory 140 storing at least one instruction, and a processor 150 executing the at least one instruction. However, the disclosure is not limited thereto, and the cooking apparatus 100 may include various components of an electronic apparatus such as a sensor, a display, a speaker, a vibration output part, etc.

The camera 110 may photograph a still image and a moving image. According to an embodiment, the camera 110 may include one or more lenses, a wide angle lens, a telephoto lens, a 3D depth lens, an image sensor, an image signal processor, or a flash.

The camera 110 may be arranged inside or outside the cooking apparatus 100, and photograph the cooking apparatus 100 and the surrounding part of the cooking apparatus 100. Specifically, the camera 110 may photograph the cooking part of the cooking apparatus 100, and the surrounding part of the cooking part.

The camera 110 may also consist of a plurality of cameras 110 that are arranged in different locations and photograph the cooking apparatus 100 and the surrounding part of the cooking apparatus 100 in different angles.

Also, the camera 110 may be an external camera 110 that is not included as one component of the cooking apparatus 100, but is connected with the cooking apparatus 100 via wire/wirelessly.

The processor 150 may acquire images that photographed the cooking apparatus 100 and the surrounding part of the cooking apparatus 100 through the camera 110. Also, the processor 150 may acquire images that photographed the cooking part wherein the cooking apparatus 100 performs cooking operations such as heating, cooling, etc., and the surrounding part of the cooking part through the camera 110.

The user interface 120 may include a button, a lever, a switch, a touch, a non-contact operation detecting sensor-type interface, etc.

The user interface 120 does not necessarily consist of one type among a button, a lever, a switch, a touch, and a non-contact operation detecting sensor-type interface, but may consist of one or more different types.

In case the user interface 120 is a touch-type user interface 120, the user interface 120 may be, for example, a capacitive touch-type user interface 120 detecting change of an electronic signal, or a decompressive touch-type user interface 120 detecting change of physical pressure.

The processor 150 may detect an input for control of the cooking apparatus 100 through the user interface 120, and acquire input information controlling a cooking operation of the cooking apparatus 100. Here, the input for control of the cooking apparatus 100 may be, for example, an input for adjusting firepower of the cooking apparatus 100 to be stronger or weaker than the current firepower, or for controlling the operations of turning on/off the power of the cooking apparatus 100. Also, the cooking operation may be, for example, an operation that the cooking apparatus 100 controls the cooking part to heat or cool a subject to be cooked. However, the disclosure is not limited thereto, and the cooking operation may mean various operations for cooking of food.

In case the user interface 120 is a touch-type user interface 120, the processor 150 may detect change of an electronic signal or change of physical pressure by a foreign substance (e.g.: water) through the touch-type user interface 120, and acquire input information for controlling a cooking operation of the cooking apparatus 100.

The communication interface 130 may include a wireless communication interface, a wired communication interface, or an input interface.

A wireless communication interface may perform communication with various kinds of external apparatuses by using a wireless communication technology or a mobile communication technology. As such a wireless communication technology, for example, Bluetooth, Bluetooth Low Energy, CAN communication, Wi-Fi, Wi-Fi Direct, ultra-wide band (UWB) communication, Zigbee, infrared Data Association (IrDA), or near field communication (NFC), etc. may be included. Also, as a mobile communication technology, 3GPP, Wi-Max, Long Term Evolution (LTE), 5G, etc. may be included. The wireless communication interface may be implemented by using an antenna that may transmit an electromagnetic wave to the outside or receive an electromagnetic wave transmitted from the outside, a communication chip, and a substrate, etc.

A wired communication interface may perform communication with various kinds of external apparatuses based on a wired communication network. Here, the wired communication network may be implemented, for example, by using a physical cable such as a pair cable, a coaxial cable, an optical fiber cable, or an Ethernet cable, etc.

Depending on embodiments, any one of the wireless communication interface and the wired communication interface may be omitted. Accordingly, the electronic apparatus may include only the wireless communication interface or the wired communication interface. Also, the electronic apparatus may include an integrated communication interface that supports both of wireless connection by a wireless communication interface and wired connection by a wired communication interface.

The electronic apparatus is not limited to a case of including one communication interface 130 performing communicative connection by one method, but may include a plurality of communication interfaces 130 performing communicative connection by a plurality of methods.

The processor 150 may perform communication with various external electronic apparatuses or a server that exist outdoors or indoors through the communication interface 130, and acquire various kinds of information necessary for control of the cooking apparatus 100.

Specifically, the processor 150 may perform communicative connection with an external electronic apparatus or an external server through the communication interface 130, and acquire recipe information including a cooking act using the cooking apparatus 100.

Here, the cooking act may mean various acts for cooking food such as a user's act of heating/cooling ingredients which are subjects of cooking by using the cooking apparatus 100, an act of stir-frying ingredients, an act of mixing ingredients, an act of flipping over ingredients, etc.

Also, the recipe information may include various kinds of information necessary for cooking food such as the ingredients, the cooking method, the cooking steps, etc. of food to be cooked.

However, the disclosure is not limited thereto, and the processor 150 may perform communicative connection with an external electronic apparatus or an external server through the communication interface 130, and acquire images that photographed the cooking apparatus 100 and the surrounding part of the cooking apparatus 100.

Also, the processor 150 may perform communicative connection with an external electronic apparatus through the communication interface 130 to make the external electronic apparatus perform some of cooking operations, and transmit various kinds of information necessary for the cooking operations of the cooking apparatus 100.

The memory 140 temporarily or non-temporarily stores various kinds of programs or data, and transmits the stored information to the processor 150 according to a call by the processor 150. Also, the memory 140 may store various kinds of information necessary for operation, processing, or control operations, etc. of the processor 150 in an electronic format.

The memory 140 may include, for example, at least one of a main memory device and an auxiliary memory device. The main memory device may have been implemented by using a semiconductor storage medium such as a ROM and/or a RAM. A ROM may include, for example, a general ROM, an EPROM, an EEPROM, and/or a MASK-ROM, etc. A RAM may include, for example, a DRAM and/or an SRAM, etc. The auxiliary memory device may be implemented by using at least one storage medium that can store data permanently or semipermanently such as optical media like a flash memory 140 device, a secure digital (SD) card, a solid state drive (SSD), a hard disc drive (HDD), a magnetic drum, a compact disc (CD), a DVD, or a laser disc, etc., a magnetic tape, an opto-magnetic disc, and/or a floppy disc, etc.

The memory 140 may store images that photographed the cooking apparatus 100 and the surrounding part of the cooking apparatus 100. The memory 140 may store one or more image frames consisting of images that photographed the cooking apparatus 100 and the surrounding part of the cooking apparatus 100.

The memory 140 may store input information for control of the cooking apparatus 100, information on a cooking act corresponding to the input information for control of the cooking apparatus 100, and a cooking operation corresponding to the input information for control of the cooking apparatus 100. The memory 140 may store information on food which is a subject of cooking, and information on a recipe including the ingredients, the cooking method, the cooking steps, etc. of the food.

The processor 150 controls the overall operations of the cooking apparatus 100. Specifically, the processor 150 may be connected to the components of the cooking apparatus 100 including the memory 140 as described above, and control the overall operations of the cooking apparatus 100 by executing at least one instruction stored in the memory 140 as described above.

The processor 150 may not only be implemented as one processor 150, but may also be implemented as a plurality of processors 150.

The processor 150 may be implemented in various methods. For example, the processor 150 may be implemented as at least one of an application specific integrated circuit (ASIC), an embedded processor 150, a microprocessor 150, a hardware control logic, a hardware finite state machine (FSM), or a digital signal processor (DSP).

Meanwhile, in the disclosure, the processor 150 may include one or more of a central processing unit (CPU) processing digital signals, a micro controller unit (MCU), a micro processing unit (MPU), a controller, an application processor (AP) 150, or a communication processor (CP) 150, and an ARM processor 150, or may be defined by the terms. Also, the processor 150 may be implemented as a system on chip (SoC) having a processing algorithm stored therein or large scale integration (LSI), or in the form of a field programmable gate array (FPGA). The processor 150 may perform various functions by executing computer executable instructions stored in the memory 140. In addition, for performing an artificial intelligence function, the processor 150 may include at least one of a graphics-processing unit (GPU), a neural processing unit (NPU), or a visual processing unit (VPU) which are separate AI-dedicated processors 150.

The specific operation of the processor 150 of controlling the cooking apparatus 100 will be described in detail with reference to FIGS. 3 to 6.

Figure 3:
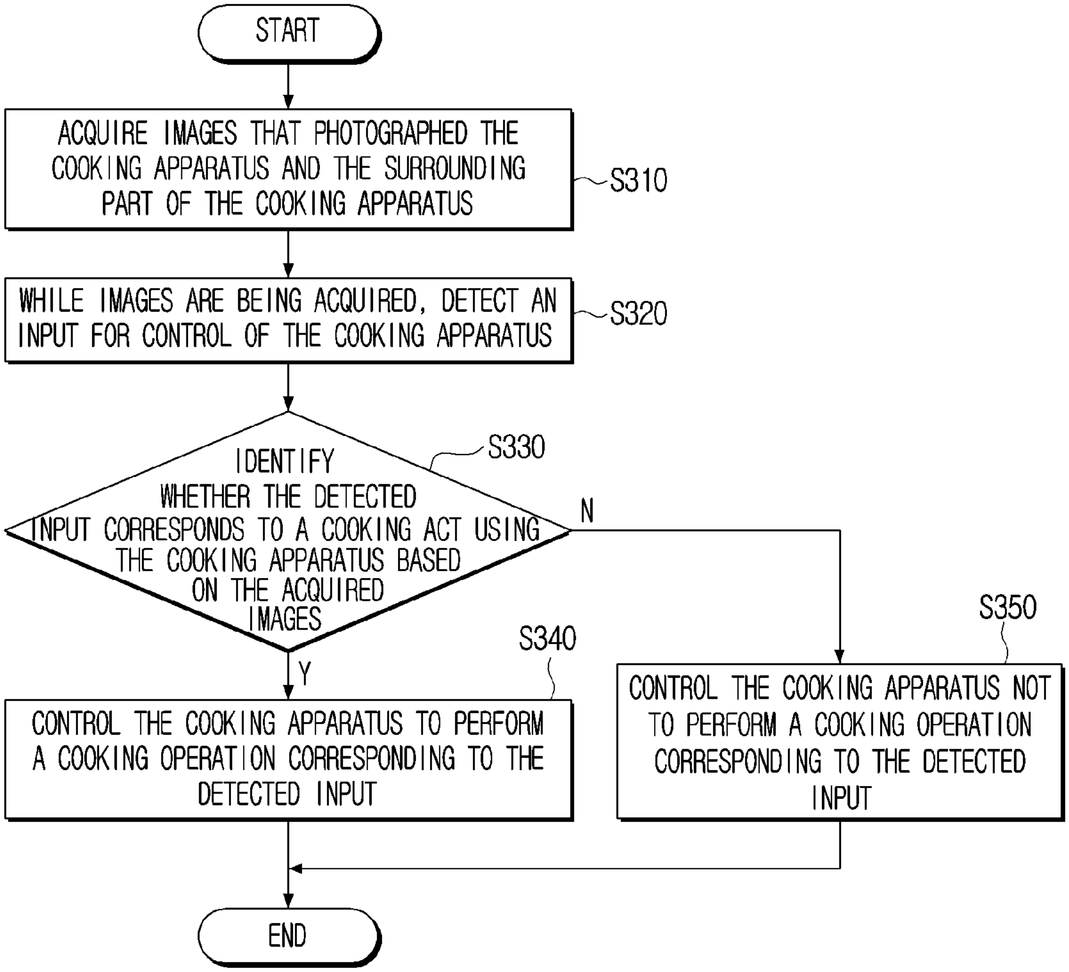
FIG. 3 is a flow chart for illustrating an operation of a cooking apparatus according to an embodiment of the disclosure.

FIG. 3 is a flow chart for illustrating an operation of the cooking apparatus 100 according to an embodiment of the disclosure.

Referring to FIG. 3, the processor 150 may acquire images that photographed the cooking apparatus 100 and the surrounding part of the cooking apparatus 100 through the camera 110. Also, the processor 150 may acquire images that photographed the cooking part wherein the cooking apparatus 100 performs cooking operations, and the surrounding part of the cooking part through the camera 110 in operation S310.

However, the disclosure is not limited thereto, and the processor 150 may perform communicative connection with an external electronic apparatus or an external server through the communication interface 130, and acquire images that photographed the cooking apparatus 100, the cooking part wherein the cooking apparatus 100 performs cooking operations, the surrounding part of the cooking apparatus 100, the surrounding part of the cooking part, etc.

While images are being acquired, the processor 150 may detect an input for control of the cooking apparatus 100 through the user interface 120 in operation S320. Here, the input for control of the cooking apparatus 100 may be a control instruction making the cooking apparatus 100 perform a cooking operation. Specifically, the input for control of the cooking apparatus 100 may be, for example, an input for adjusting firepower of the cooking apparatus 100 to be stronger or weaker than the current firepower, or for controlling the operations of turning on/off the power of the cooking apparatus 100. Also, the cooking operation may be, for example, an operation of the cooking apparatus 100 of controlling the cooking part to heat or cool the subject to be cooked. However, the disclosure is not limited thereto, and the cooking operation may mean various operations for cooking of food.

Specifically, while images are being acquired, the processor 150 may detect a touch input, a non-contact gesture input, or a manipulation input of a button or a lever, etc. for control of the cooking apparatus 100 through the touch-type user interface 120.

Based on the acquired images, the processor 150 may identify whether the detected input corresponds to a cooking act using the cooking apparatus 100 in operation S330. However, the disclosure is not limited thereto, and the cooking apparatus 100 may identify whether the detected input corresponds to a cooking act using the cooking apparatus 100 based on audio data acquired through the speaker. Here, the audio data may be sounds corresponding to a cooking act (e.g.: a boiling sound, a frying sound, a grilling sound, a stir-frying sound, etc.).

Specifically, the processor 150 may identify whether the detected input for control of the cooking apparatus 100 corresponds to the user's cooking act (e.g.: heating, cooling, grilling, flipping over, stir-frying, mixing) included in the acquired images or audio data. In case the processor 150 detected an input for a heating operation of the cooking apparatus 100 through the user interface 120, the processor 150 may identify whether the user's cooking act included in the acquired images or audio data corresponds to a heating operation of the cooking apparatus 100.

Based on the identification that the input detected through the user interface 120 corresponds to a cooking act using the cooking apparatus 100 in operation S330-Y, the processor 150 may perform a cooking operation corresponding to the detected input in operation S340.

For example, in case the processor 150 detected an input for a heating operation of the cooking apparatus 100 through the user interface 120, based on the identification that the user's cooking act included in the acquired images or audio data corresponds to a heating operation of the cooking apparatus 100, the processor 150 may perform a heating operation corresponding to the detected input.

based on the identification that the input detected through the user interface 120 does not correspond to a cooking act using the cooking apparatus 100 in operation S330-N, the processor 150 may not perform a cooking operation corresponding to the detected input in operation S350.

In this case, by the input detected through the user interface 120, the processor 150 may have detected change of an electrostatic signal or change of the pressure through the user interface 120 due to a foreign substance (e.g.: water) splattered on the user interface 120 during the cooking process, and have acquired input information for control of the cooking apparatus 100.

Figure 4:
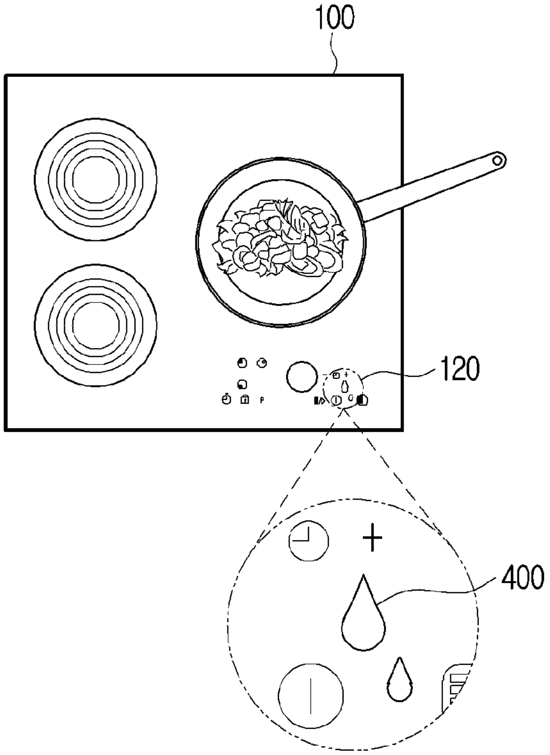
FIG. 4 is a diagram for illustrating a malfunction of a cooking apparatus caused by a foreign substance according to an embodiment of the disclosure.

FIG. 4 is a diagram for illustrating a malfunction of the cooking apparatus 100 by a foreign substance according to an embodiment of the disclosure.

Referring to FIG. 4, a part of the ingredients of the food or water 400 contained in the cooking tool wherein cooking is performed in the cooking apparatus 100 may splatter, and the user interface 120 arranged in a partial area of the cooking apparatus 100 may be polluted. Here, in case the user interface 120 is a touch-type user interface 120, even though the input is not an intentional input by the user, the processor 150 may detect change of an electrostatic signal by the water 400 through the touch-type user interface 120, and acquire input information for control of the cooking apparatus 100, and accordingly, a malfunction may occur.

Specifically, in case the water 400 splattered on an area for controlling a heating operation in the user interface 120 of the cooking apparatus 100, the processor 150 may detect change of an electrostatic signal due to the water 400 through the touch-type user interface 120, and acquire input information regarding a heating operation.

Here, based on the identification that the user's cooking act included in the images that photographed the cooking apparatus 100 and the surrounding part of the cooking apparatus 100 does not correspond to a heating operation of the cooking apparatus 100, the processor 150 may not perform a heating operation corresponding to the detected input.

Accordingly, the processor 150 can prevent occurrence of a malfunction of the cooking apparatus 100 by an input due to a foreign substance not intended by the user.

Figure 5:
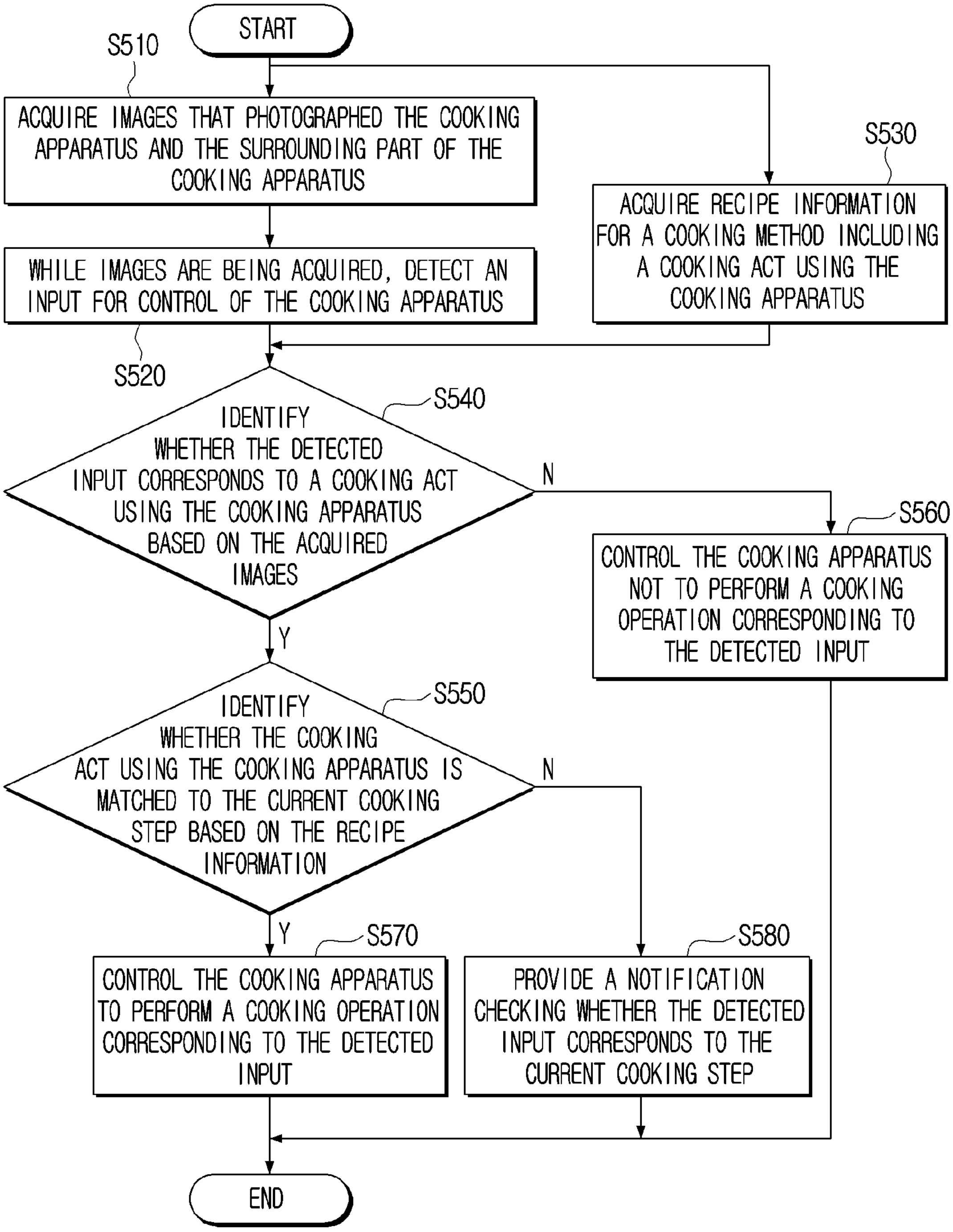
FIG. 5 is a flow chart for illustrating an operation of a cooking apparatus according to an embodiment of the disclosure.

FIG. 5 is a flow chart for illustrating an operation of the cooking apparatus 100 according to an embodiment of the disclosure.

Referring to FIG. 5, the processor 150 may acquire images that photographed the cooking apparatus 100 and the surrounding part of the cooking apparatus 100 through the camera 110. Also, the processor 150 may acquire images that photographed the cooking part wherein the cooking apparatus 100 performs cooking operations, and the surrounding part of the cooking part through the camera 110 in operation S510.

However, the disclosure is not limited thereto, and the processor 150 may perform communicative connection with an external electronic apparatus or an external server through the communication interface 130, and acquire images that photographed the cooking apparatus 100, the cooking part wherein the cooking apparatus 100 performs cooking operations, the surrounding part of the cooking apparatus 100, the surrounding part of the cooking part, etc.

While images are being acquired, the processor 150 may detect an input for control of the cooking apparatus 100 through the user interface 120 in operation S520. Here, the input for control of the cooking apparatus 100 may be a control instruction making the cooking apparatus 100 perform a cooking operation.

Specifically, while images are being acquired, the processor 150 may detect a touch input, a non-contact gesture input, a manipulation input of a button or a lever, etc. for control of the cooking apparatus 100 through the touch-type user interface 120.

The processor 150 may perform communicative connection with an external server through the communication interface 130, and acquire recipe information for a cooking method including a cooking act using the cooking apparatus 100 in operation S530. Here, the recipe information may include various kinds of information necessary for cooking food such as the ingredients, the cooking method, the cooking steps, etc. of food to be cooked.

The processor 150 may detect an input for control of the cooking apparatus 100 through the user interface 120, and based on the identification that the credibility of the acquired information is smaller than or equal to a predetermined value, the processor 150 may identify whether the input for control of the cooking apparatus 100 corresponds to the current cooking step based on the acquired recipe information. based on the identification that the input for control of the cooking apparatus 100 corresponds to the current cooking step based on the acquired recipe information, the processor 150 may adjust the firepower in the current cooking step or perform the operations of turning on/off the power of the cooking apparatus 100 based on the input for control of the cooking apparatus 100.

The processor 150 may acquire recipe information for a cooking method including a cooking act using the cooking apparatus 100 after detecting an input for control of the cooking apparatus 100, or acquire recipe information for a cooking method independently regardless of detection of an input for control of the cooking apparatus 100.

The processor 150 may identify whether the detected input corresponds to a cooking act using the cooking apparatus 100 based on the acquired images in operation S540. However, the disclosure is not limited thereto, and the cooking apparatus 100 may identify whether the detected input corresponds to a cooking act using the cooking apparatus 100 based on audio data acquired through the speaker. Here, the audio data may be sounds corresponding to a cooking act (e.g.: a boiling sound, a frying sound, a grilling sound, a stir-frying sound, etc.).

Specifically, the processor 150 may identify whether the detected input for control of the cooking apparatus 100 corresponds to the user's cooking act (e.g.: heating, cooling, grilling, flipping over, stir-frying, mixing) included in the acquired images or audio data. In case the processor 150 detected an input for a heating operation of the cooking apparatus 100 through the user interface 120, the processor 150 may identify whether the user's cooking act included in the acquired images or audio data corresponds to a heating operation of the cooking apparatus 100.

Based on the identification that the input detected through the user interface 120 corresponds to a cooking act using the cooking apparatus 100 in operation S540-Y, the processor 150 may identify whether the cooking act using the cooking apparatus 100 is matched to the current cooking step based on the recipe information in operation S550.

For example, in case the processor 150 detected an input for a heating operation of the cooking apparatus 100 through the user interface 120, based on the identification that the user's cooking act included in the acquired images or audio data corresponds to a heating operation of the cooking apparatus 100, the processor 150 may identify whether the heating operation using the cooking apparatus 100 is matched to the current cooking step based on the recipe information.

based on the identification that the input detected through the user interface 120 does not correspond to a cooking act using the cooking apparatus 100 in operation S540-N, the processor 150 may not perform a cooking operation corresponding to the detected input in operation S560.

In this case, by the input detected through the user interface 120, the processor 150 may have detected change of an electrostatic signal or change of the pressure through the user interface 120 due to a foreign substance (e.g.: water) splattered on the user interface 120 during the cooking process, and have acquired input information for control of the cooking apparatus 100. A specific example in this regard was described above with reference to FIG. 3.

based on the identification that the detected input corresponds to a cooking act using the cooking apparatus 100, and it is identified that the cooking act is matched to the current cooking step in operation S550-Y, the processor 150 may perform a cooking operation corresponding to the detected input in operation S570.

For example, based on an image of receiving an input for a heating operation from a user being included in the images that were acquired by photographing the cooking apparatus 100 and the surrounding part of the cooking apparatus 100, the processor 150 may identify that the detected input for a heating operation of the cooking apparatus 100 was directly input by the user for performing a heating operation. Also, based on a heating operation as above being an appropriate cooking act matched to the current cooking step based on the recipe information, the processor 150 may perform a heating operation corresponding to the detected input.

based on the identification that the detected input corresponds to a cooking act using the cooking apparatus 100, and it is identified that the cooking act is not matched to the current cooking step in operation S550-N, the processor 150 may provide a notification checking whether the detected input corresponds to the current cooking step in operation S580.

In case an input for a heating operation was detected, the processor 150 may identify that the current cooking step is not matched to the heating operation based on the recipe information. In this case, the processor 150 may provide a notification checking whether the detected input for a heating operation corresponds to the current cooking step.

Here, the notification provided to the user may be visual information provided through a display, or auditory information provided through a speaker, or tactile information provided through a vibration output part, and a notification using a plurality of different methods but not a method by any one type among them may be provided.

Other than the above, based on the identification that the detected input corresponds to a cooking act using the cooking apparatus 100, and it is identified that the cooking act is not matched to the current cooking step in operation S550-N, the processor 150 may, based on identifying that the cooking act is not matched to the current cooking step, provide a notification including information on a cooking act matched to the current cooking step based on the recipe information. Here, the method of providing a notification to the user is as described above.

Accordingly, the processor 150 may detect again an input for appropriate control of the cooking apparatus 100 matched to the current cooking step input by the user who was provided with information on the appropriate cooking method, and perform a cooking operation.

Figure 6:
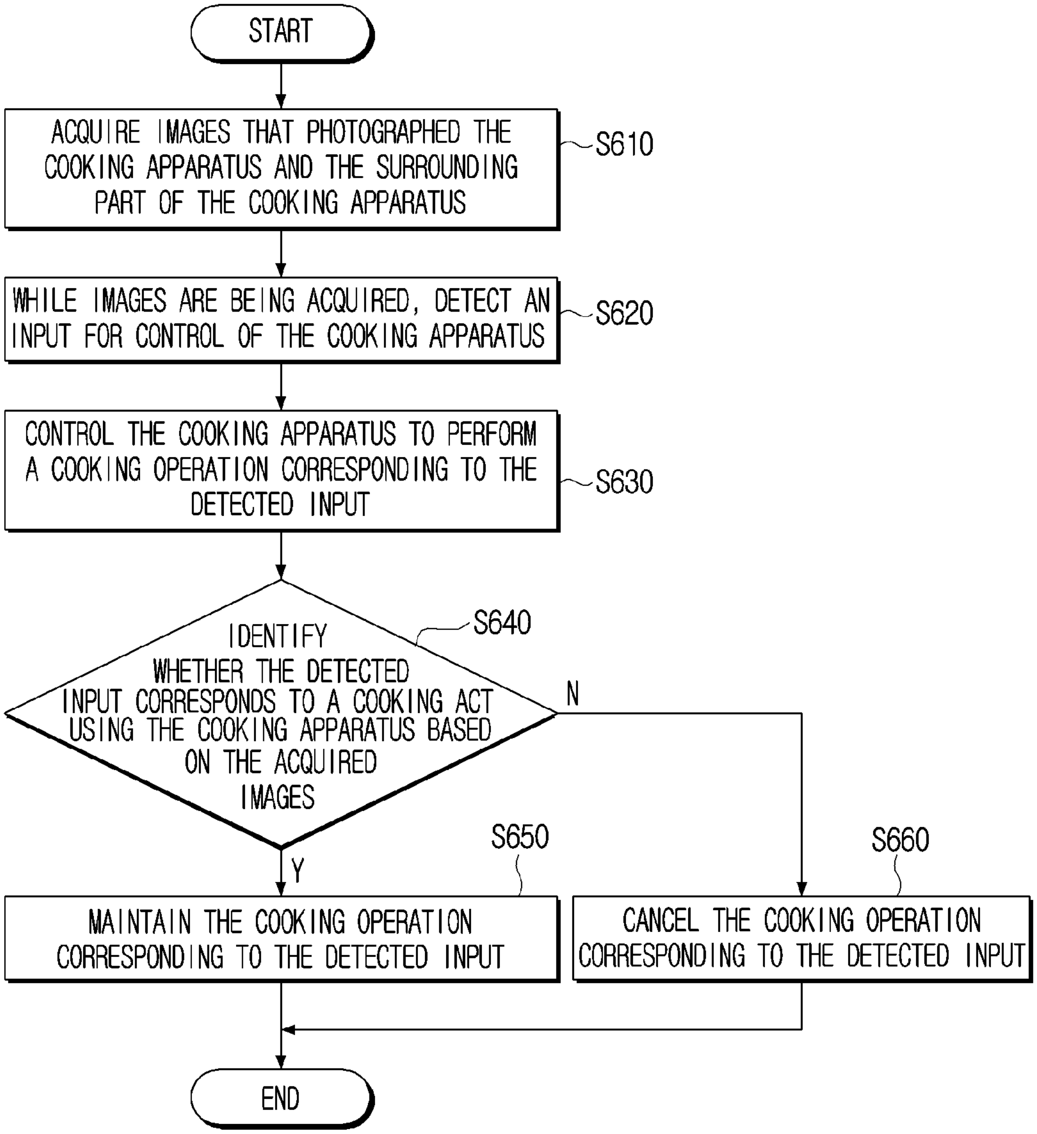
FIG. 6 is a flow chart for illustrating an operation of a cooking apparatus according to an embodiment of the disclosure.

FIG. 6 is a flow chart for illustrating an operation of the cooking apparatus 100 according to an embodiment of the disclosure.

Referring to FIG. 6, the processor 150 may acquire images that photographed the cooking apparatus 100 and the surrounding part of the cooking apparatus 100 through the camera 110. Also, the processor 150 may acquire images that photographed the cooking part wherein the cooking apparatus 100 performs cooking operations, and the surrounding part of the cooking part through the camera 110 in operation S610.

However, the disclosure is not limited thereto, and the processor 150 may perform communicative connection with an external electronic apparatus or an external server through the communication interface 130, and acquire images that photographed the cooking apparatus 100, the cooking part wherein the cooking apparatus 100 performs cooking operations, the surrounding part of the cooking apparatus 100, the surrounding part of the cooking part, etc.

While images are being acquired, the processor 150 may detect an input for control of the cooking apparatus 100 through the user interface 120 in operation S620. Here, the input for control of the cooking apparatus 100 may be a control instruction making the cooking apparatus 100 perform a cooking operation.

Specifically, while images are being acquired, the processor 150 may detect a touch input, a non-contact gesture input, or a manipulation input of a button or a lever, etc. for control of the cooking apparatus 100 through the touch-type user interface 120.

The processor 150 may perform a cooking operation corresponding to the detected input regardless of whether the detected input is a cooking act using the cooking apparatus 100 in operation S630.

The processor 150 may identify whether the detected input corresponds to a cooking act using the cooking apparatus 100 based on the acquired images in operation S640. However, the disclosure is not limited thereto, and the cooking apparatus 100 may identify whether an input detected based on audio data acquired through the speaker corresponds to a cooking act using the cooking apparatus 100. Here, the audio data may be sounds corresponding to a cooking act (e.g.: a boiling sound, a frying sound, a grilling sound, a stir-frying sound, etc.).

Afterwards, based on the identification that the detected input corresponds to a cooking act using the cooking apparatus 100 in operation S640-Y, the processor 150 may maintain the cooking operation corresponding to the detected input in operation S650.

Afterwards, based on the identification that the detected input does not correspond to a cooking act using the cooking apparatus 100 in operation S640-N, the processor 150 may cancel the cooking operation corresponding to the detected input in operation S660.

The processor 150 performs a cooking operation corresponding to the detected input first regardless of whether the detected input is a cooking act using the cooking apparatus 100, and afterwards, based on the identification that the detected input does not correspond to a cooking act using the cooking apparatus 100, the processor 150 cancels the cooking operation in a posterior manner, and thus this operation may be utilized in case the processing speed of the processor 150 is slow, or the speed of identifying an image frame is slow.

As described above, the processor 150 may perform a control operation of the cooking apparatus 100 by various methods based on images that photographed the cooking apparatus 100 and the surrounding part of the cooking apparatus 100, an input detected through the user interface 120, and the acquired recipe information.

Hereinafter, a method for the processor 150 to identify whether a detected input corresponds to a user's cooking act based on image frames that divided an acquired image will be described in more detail with reference to FIG. 7.

Figure 7A:
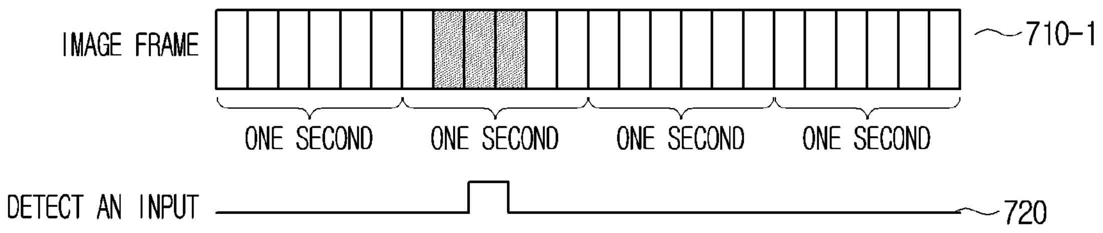
FIG. 7A is a diagram for illustrating an operation of identifying whether a detected input corresponds to a cooking act using a cooking apparatus based on section image frames of an image acquired by the cooking apparatus according to an embodiment of the disclosure.
Figure 7B:
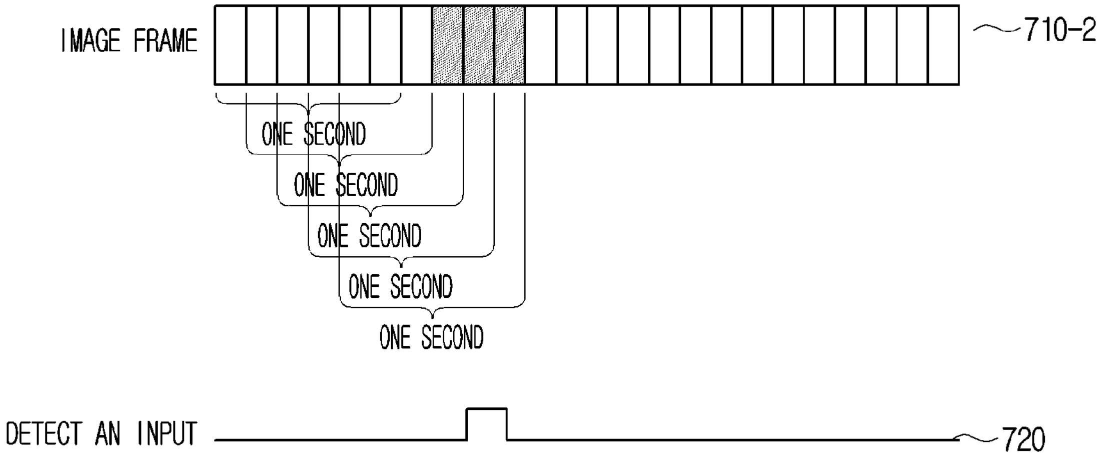
FIG. 7B is a diagram for illustrating an operation of identifying whether a detected input corresponds to a cooking act using a cooking apparatus based on section image frames of an image acquired by the cooking apparatus according to an embodiment of the disclosure.

FIG. 7A and FIG. 7B are diagrams for illustrating an operation of identifying whether a detected input corresponds to a cooking act using the cooking apparatus 100 based on section image frames of an image acquired by the cooking apparatus 100 according to an embodiment of the disclosure.

Referring to FIG. 7A, the processor 150 may acquire a plurality of image frames 710-1 that photographed the cooking apparatus 100 and the surrounding part of the cooking apparatus 100.

The processor 150 may identify section image frames divided by each predetermined section among the plurality of acquired image frames 710-1. Here, the section image frames may have been divided in predetermined time units, and basically do not include the same image frames.

The processor 150 may identify whether an input 720 detected based on the identified section image frames corresponds to a cooking act using the cooking apparatus 100.

Here, for identifying which act the cooking act included in the image frames is, an artificial intelligence model (e.g.: a classification model of a user's cooking acts) may be used. The classification model of a user's cooking acts may be an artificial intelligence model that was trained by using images or voice data which are input data, or vector values corresponding to a user's cooking acts which are output data as learning data.

The processor 150 may input images or voice data into the classification model of a user's cooking acts into the memory or an external server, and acquire vector values corresponding to the user's cooking acts. The processor 150 may acquire information on the user's cooking acts classified by each type based on the vector values output from the classification model of a user's cooking acts.

The artificial intelligence model may consist of a plurality of neural network layers. Each layer has a plurality of weight values, and performs an operation of the layer through the operation result of the previous layer and an operation of the plurality of weight values. As examples of a neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks, but the neural network in the disclosure is not limited to the aforementioned examples excluding specified cases.

The processor 150 may input the plurality of image frames 710-1 into the trained artificial intelligence model, and acquire information regarding to which cooking acts (e.g.: heating, cooling, grilling, stir-frying, mixing) the user's cooking acts included in the plurality of image frames correspond. The processor 150 may identify whether the input 720 detected through the user interface 120 corresponds to the user's cooking act identified by using the artificial intelligence model among the plurality of image frames 710-1, and determine whether to perform a cooking operation.

based on the identification that the credibility of a vector value output by using the artificial intelligence model is smaller than or equal to a predetermined value, the processor 150 may identify whether the input for control of the cooking apparatus 100 corresponds to the current cooking step based on the acquired recipe information. based on the identification that the input for control of the cooking apparatus 100 corresponds to the current cooking step based on the acquired recipe information, the processor 150 may adjust the firepower in the current cooking step or perform the operations of turning on/off the power of the cooking apparatus 100 based on the input for control of the cooking apparatus 100.

Referring to FIG. 7B, the divided section image frames may include first section image frames and second section image frames identified by each of the predetermined sections, and the first section image frames and the second section image frames may include at least one same image frame (710-2).

Here, the processor 150 may identify whether the processing speed is greater than or equal to a predetermined value. Here, the processor 150 may identify whether the processing speed is greater than or equal to the predetermined value based on the core number of the CPU, the clock speed, whether there is an NPU, the speed of the NPU, etc. Here, the NPU is a specialized chip that can accelerate deep learning, and in case there is an NPU, an operation of a higher speed becomes possible by allotting a part of the operation to the NPU.

That is, the processor 150 may include a module that can identify the image frame recognition speed based on the information on the CPU/NPU and the clock speed.

As the core number of the CPU is greater, the processor 150 may identify that the processing speed is fast, and as the core number of the CPU is smaller, the processor 150 may identify that the processing speed is slow. Also, as the clock speed is faster, the processor 150 may identify that the processing speed is fast, and as the clock speed is slower, the processor may identify that the processing speed is slow. Further, if an NPU exists, the processor 150 may identify that the processing speed is fast, and if an NPU does not exist, the processor 150 may identify that the processing speed is slow.

In case it is identified that the processing speed is greater than or equal to the predetermined value, the processor 150 may identify image frames by an overlapping method wherein different section image frames 710-2 include at least one same image frame. That is, as the image frames of one section 710-2 include overlapping image frames, the processor 150 may acquire information corresponding to the user's cooking acts included in the image frames faster. Ultimately, the processor 150 may identify whether the detected input 720 corresponds to the user's cooking acts included in the image frames faster.

Also, it case it is identified that the processing speed of the processor 150 is smaller than or equal to the predetermined value, the processor 150 may perform a cooking operation corresponding to the detected input regardless of whether the detected input is a cooking act using the cooking apparatus 100.

The processor 150 may identify whether the detected input corresponds to a cooking act using the cooking apparatus 100 based on the acquired section image frames.

Afterwards, based on the identification that the detected input corresponds to a cooking act using the cooking apparatus 100, the processor 150 may maintain the cooking operation corresponding to the detected input.

Afterwards, based on the identification that the detected input does not correspond to a cooking act using the cooking apparatus 100, the processor 150 may cancel the cooking operation corresponding to the detected input.

Figure 8:
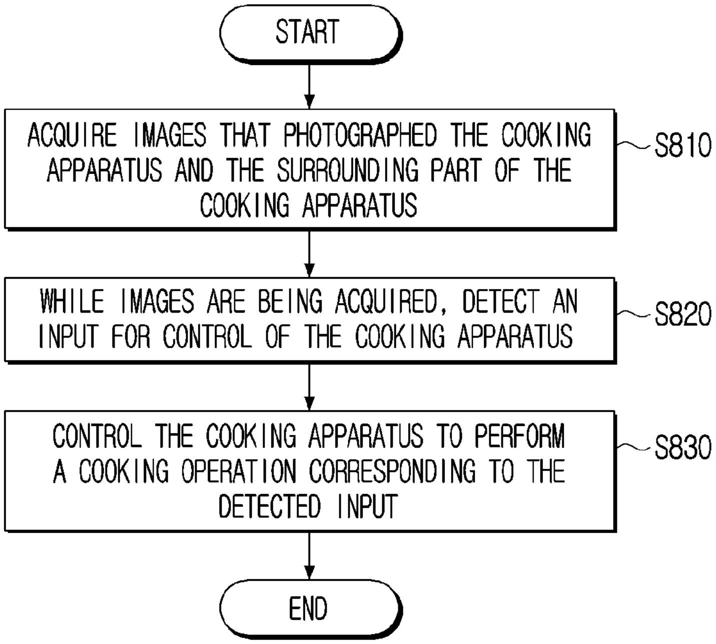
FIG. 8 is a flow chart for illustrating an operation of a cooking apparatus according to an embodiment of the disclosure.

FIG. 8 is a flow chart for illustrating an operation of the cooking apparatus 100 according to an embodiment of the disclosure.

Referring to FIG. 8, the cooking apparatus 100 may acquire images that photographed the cooking apparatus 100 and the surrounding part of the cooking apparatus 100 through the camera 110. Also, the cooking apparatus 100 may acquire images that photographed the cooking part wherein the cooking apparatus 100 performs cooking operations, and the surrounding part of the cooking part through the camera 110 in operation S810.

However, the disclosure is not limited thereto, and the cooking apparatus 100 may perform communicative connection with an external electronic apparatus or an external server through the communication interface 130, and acquire images that photographed the cooking apparatus 100, the cooking part wherein the cooking apparatus 100 performs cooking operations, the surrounding part of the cooking apparatus 100, the surrounding part of the cooking part, etc.

While images are being acquired, the cooking apparatus 100 may detect an input for control of the cooking apparatus 100 through the user interface 120 in operation S820. Here, the input for control of the cooking apparatus 100 may be a control instruction making the cooking apparatus 100 perform a cooking operation.

Specifically, while images are being acquired, the cooking apparatus 100 may detect a touch input, a non-contact gesture input, a manipulation input of a button or a lever, etc. for control of the cooking apparatus 100 through the touch-type user interface 120.

The cooking apparatus 100 may identify whether the detected input corresponds to a cooking act using the cooking apparatus 100 based on the acquired images. However, the disclosure is not limited thereto, and the cooking apparatus 100 may identify whether the detected input corresponds to a cooking act using the cooking apparatus 100 based on audio data acquired through the speaker. Here, the audio data may be sounds corresponding to a cooking act (e.g.: a boiling sound, a frying sound, a grilling sound, a stir-frying sound, etc.).

Based on the identification that the input detected through the user interface 120 corresponds to a cooking act using the cooking apparatus 100, the cooking apparatus 100 may perform a cooking operation corresponding to the detected input in operation S830.

based on the identification that the input detected through the user interface 120 does not correspond to a cooking act using the cooking apparatus 100, the cooking apparatus 100 may not perform a cooking operation corresponding to the detected input.

Also, based on the identification that the detected input corresponds to a cooking act using the cooking apparatus 100, the cooking apparatus 100 may identify whether the cooking act using the cooking apparatus 100 is matched to the current cooking step based on recipe information acquired from an external electronic apparatus or an external server through the communication interface 130.

Based on the identification that the detected input corresponds to a cooking act using the cooking apparatus 100, and it is identified that the cooking act is matched to the current cooking step, the cooking apparatus 100 may perform a cooking operation corresponding to the detected input.

Based on the identification that the cooking act is not matched to the current cooking step, the cooking apparatus 100 may provide a notification checking whether the detected input corresponds to the current cooking step.

Other than the above, based on the identification that the cooking act is not matched to the current cooking step, the cooking apparatus 100 may provide a notification including information on a cooking act matched to the current cooking step based on the recipe information.

According to an embodiment, methods according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed directly on-line (e.g.: download or upload) through an application store (e.g.: Play Store™), or between two user apparatuses (e.g.: smartphones). In the case of on-line distribution, at least a portion of a computer program product (e.g.: a downloadable app) may be stored in a storage medium readable by machines such as the server of the manufacturer, the server of the application store, and the memory of the relay server at least temporarily, or may be generated temporarily.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A cooking apparatus performing a cooking operation, the cooking apparatus comprising:

a camera configured to capture an image of the cooking apparatus and at least part of an area surrounding the cooking apparatus;

a user interface;

at least one memory storing at least one instruction; and at least one processor, wherein the at least one instruction, when executed by the at least one processor individually or collectively, causes the cooking apparatus to:

acquire, through the camera, the image of the cooking apparatus and the at least part of the area surrounding the cooking apparatus, identify, among a plurality of image frames of the image, a plurality of sectioned image frames divided into predetermined sections;

detect, through the user interface, an input of a user to control the cooking apparatus to perform the cooking operation comprising at least one of introducing heating, removing heating, increasing heating, decreasing heating, activating the cooking apparatus, or deactivating the cooking apparatus, based on the plurality of sectioned image frames and the input detected through the user interface, identify whether the user intends to enter the input to initiate the cooking operation, and based on identifying that the user intends to enter the input to initiate the cooking operation, control the cooking apparatus to perform the cooking operation, wherein the plurality of sectioned image frames are divided into predetermined sections based on a processing speed of the at least one processor.

2. The cooking apparatus of claim 1, wherein the at least one instruction, when executed by the at least one processor individually or collectively, further causes the cooking apparatus to, based on identifying that the user does not intend to enter the input to initiate the cooking operation, prevent performance of the cooking operation.

3. The cooking apparatus of claim 1, further comprising a communication interface configured to communicate with an external electronic apparatus, and wherein the at least one instruction, when executed by the at least one processor individually or collectively, further causes the cooking apparatus to:

based on identifying that the user intends to enter the input to initiate the cooking operation, identify whether the cooking operation is matched to a current cooking step based on recipe information, and based on identifying that the cooking operation is matched to the current cooking step, control the cooking apparatus to perform the cooking operation.

4. The cooking apparatus of claim 3, wherein the at least one instruction, when executed by the at least one processor individually or collectively, further causes the cooking apparatus to, based on identifying that the cooking operation is not matched to the current cooking step, provide a notification seeking confirmation that the user intends to initiate the cooking operation.

5. The cooking apparatus of claim 3, wherein the at least one instruction, when executed by the at least one processor individually or collectively, further causes the cooking apparatus to, based on identifying that the cooking operation is not matched to the current cooking step, provide a notification comprising information on the cooking operation matched to the current cooking step based on the recipe information.

6. The cooking apparatus of claim 1, wherein the at least one instruction, when executed by the at least one processor individually or collectively, further causes the cooking apparatus to, based on identifying that the user does not intend to enter the input to initiate the cooking operation, initiate the cooking operation and subsequently cancel the cooking operation.

7. The cooking apparatus of claim 1, wherein the plurality of sectioned image frames comprise a first plurality of section image frames and a second plurality of section image frames corresponding to one or more predetermined sections, and wherein the first plurality of section image frames and the second plurality of section image frames comprise at least one same image frame from among the plurality of image frames.

8. A method of controlling a cooking apparatus performing a cooking operation, the method comprising:

acquiring, through a camera of the cooking apparatus, an image of the cooking apparatus and at least part of an area surrounding the cooking apparatus, wherein the cooking apparatus comprises at least one of a cooktop or an oven;

identifying, among a plurality of image frames of the image, a plurality of sectioned image frames divided into predetermined sections;

detecting, through a user interface of the cooking apparatus, an input of a user to control the cooking apparatus to perform the cooking operation comprising at least one of introducing heating, removing heating, increasing heating, decreasing heating, activating the cooking apparatus, or deactivating the cooking apparatus;

based on the plurality of sectioned image frames and the input detected through the user interface, identifying whether the user intends to enter the input to initiate the cooking operation; and based on identifying that the user intends to enter the input to initiate the cooking operation, controlling the cooking apparatus to perform the cooking operation, wherein the plurality of sectioned image frames are divided into predetermined sections based on a processing speed of at least one processor of the cooking apparatus.

9. The method of claim 8, further comprising:

based on identifying that the user does not intend to enter the input to initiate the cooking operation, preventing performance of the cooking operation.

10. The method of claim 8, further comprising:

acquiring recipe information; and based on identifying that the user intends to enter the input to initiate the cooking operation, identifying whether the cooking operation is matched to a current cooking step based on the recipe information, and wherein the performing the cooking operation comprises:

based on identifying that the user intends to enter the input to initiate the cooking operation and identifying that the cooking operation is matched to the current cooking step, performing the cooking operation.

11. The method of claim 10, further comprising:

based on identifying that the cooking operation is not matched to the current cooking step, providing a notification seeking confirmation that the user intends to initiate the cooking operation.

12. The method of claim 10, further comprising:

based on identifying that the cooking operation is not matched to the current cooking step, providing a notification comprising information on the cooking operation matched to the current cooking step based on the recipe information.

13. The method of claim 8, further comprising:

based on identifying that the user does not intend to enter the input to initiate the cooking operation, initiating the cooking operation and subsequently canceling the cooking operation.

14. A non-transitory computer-readable recording medium having instructions stored therein, which when executed by at least one processor cause the at least one processor to execute a method of controlling a cooking apparatus performing a cooking operation, the method comprising:

acquiring, through a camera of the cooking apparatus, an image of the cooking apparatus and at least part of an area surrounding the cooking apparatus, wherein the cooking apparatus comprises at least one of a cooktop or an oven;

identifying, among a plurality of image frames of the image, a plurality of sectioned image frames divided into predetermined sections;

detecting, through a user interface of the cooking apparatus, an input of a user to control the cooking apparatus to perform the cooking operation comprising at least one of introducing heating, removing heating, increasing heating, decreasing heating, activating the cooking apparatus, or deactivating the cooking apparatus;

based on the plurality of sectioned image frames and the input detected through the user interface, identifying whether the user intends to enter the input to initiate the cooking operation; and based on identifying that the user intends to enter the input to initiate the cooking operation, controlling the cooking apparatus to perform the cooking operation, wherein the plurality of sectioned image frames are divided into predetermined sections based on a processing speed of the at least one processor.

* * * * *